Oct. 21, 1969 M. L. STRICKLAND 3,474,269

ELECTRONIC CRYSTAL SELECTOR

Filed Nov. 18, 1968

INVENTOR
MARION L. STRICKLAND
BY
Fritz B. Peterson

1

3,474,269

ELECTRONIC CRYSTAL SELECTOR

Marion L. Strickland, North Hollywood, Calif., assignor, by mesne assignments, to Bourns, Inc., Riverside, Calif., a corporation of California Filed Nov. 18, 1968, Ser. No. 776,584
Int. Cl. H04r *17/00*
U.S. Cl. 310—9.1 5 Claims

ABSTRACT OF THE DISCLOSURE

Simple, inexpensive and compact means for containing a plurality of piezo-crystal devices, permitting selective movement of any of the devices into an active position in which the selected device is automatically switched or connected into a circuit with concurrent indication of the particular piezo device selected, with means for releasably retaining the selected device in connected position and means permitting ready substitution of a new device for any of the contained devices while providing mechanical protection for the devices.

Background of the invention

Relatively cumbersome, complex and expensive apparatuses have previously been provided for holding a plurality of piezoelectric devices, such as quartz-crystal units, for selective rotation into a position in which the selected unit is electrically connected to circuit means via spring contacts. Some such apparatuses, such as those depicted in U.S. Patent Nos. 1,663,682; 1,639,817; 2,157,576; and 3,300,665, are such that the apparatus must be disassembled if substitution of crystal devices is to be made. In others of prior art devices, which means are provided for furnishing an indication as to the selected crystal device, as in U.S. Patent No. 1,654,189 for example, the devices are complex and bulky and require synchronization of parts during assembly to insure accurate indications. Also, in those prior art apparatuses in which provision has been made for substitution of crystal devices without substantial disassembly, as in the last-mentioned U.S. patent, vibration or change of spatial attitude can result in accidental complete or partial displacement of the device from the apparatus. In the case of only partial displacement, the device can readily be damaged or ruined when selection of a different crystal device is attempted. The present invention has as primary objects to overcome the noted disadvantages of the previously known crystal selector apparatuses.

Field of the invention

In radio receivers and transmitters and allied apparatuses, selection of electromagnetic or electric wave signal frequency or wave length is variously effected, as by varying inductive or capacitive means comprised in tunable oscillatory circuits. In instances wherein only certain predetermined signal frequencies are to be of interest, and especially wherein the precision of frequency-selection must be high and/or very quickly attained, resort is had to connection in the circuits of piezoelectric crystal devices. The present invention pertains to simple, inexpensive, compact and efficient means for precisely connecting into a circuit any desired one of a large number of crystal devices is a circuit with ease and precision, while permitting easy replacement or exchange of crystal devices.

Thus the present invention provides a stationary member serving as a base, in which base is a cylindrical recess or well in which is arranged for close-fitting rotation a radially peripherally-slotted rotor in the slots of which standard crystal devices are adapted to snugly fit and be carried about the axis of the rotor. The base is provided with a slot through which exchange of crystal devices

2 may readily be manually effected, the slot having a readily displaceable cover or closure which normally closes the slot and prevents undesirable displacement of any of the contained crystal devices. An exterior end face of the rotor is radially slotted to permit the two terminal pins of the respective crystal devices to protrude for engagement with respective ones of a pair of spring-leaf contacts when the device is moved into active position. A spring-pressed ball detent disposed in a bore in the base is arranged to engage in any of a peripheral series of accurately-spaced depressions provided in the outer cylindrical surface of the rotor. The disposition of the coacting parts in such that the detent means aid in bringing into accurate register the terminals and contacts, and position-indicator means, and such that the detent means releasably but firmly retain the rotor in any of the plurality of positions in which a crystal device is electrically engaged with the spring-leaf contacts. The rotor is carried on a manually rotatable shaft which is journaled in the base; and has on an end face thereof a circular array or series of indicia each of which is arranged to register with an opening in the front face of the base when the corresponding crystal device is in electrical engagement with the spring-leaf contacts, whereby a visible indication is provided of the crystal device then in active position. A manually-operable knob, or equivalent other means, is secured to the rotor-shaft for facilitating operation of the apparatus. A second series of indicia, on a rear face of the motor, facilitates accurate insertion of crystal devices into the slots or pockets of the rotor.

Description of the drawings

The subsequent description of the preferred exemplary selector according to the invention makes references to the accompanying drawings in which.

Description of the illustrated selector

Referring first to FIGURES 1–4 and 7, the selector comprises a base 10 which serves to support the operative components of the selector. The base has a flat bottom surface **10*f* on which it may repose or by which it may abut against a complementary surface of a radio apparatus in which it is to be incorporated; attachment in such case may be by screw means. The base further has a cylindrical recess 10*r* (FIGURE 7) and an axial bore 10*b* through the front wall 10*w***.

Figures 4, 5, 6, 7:
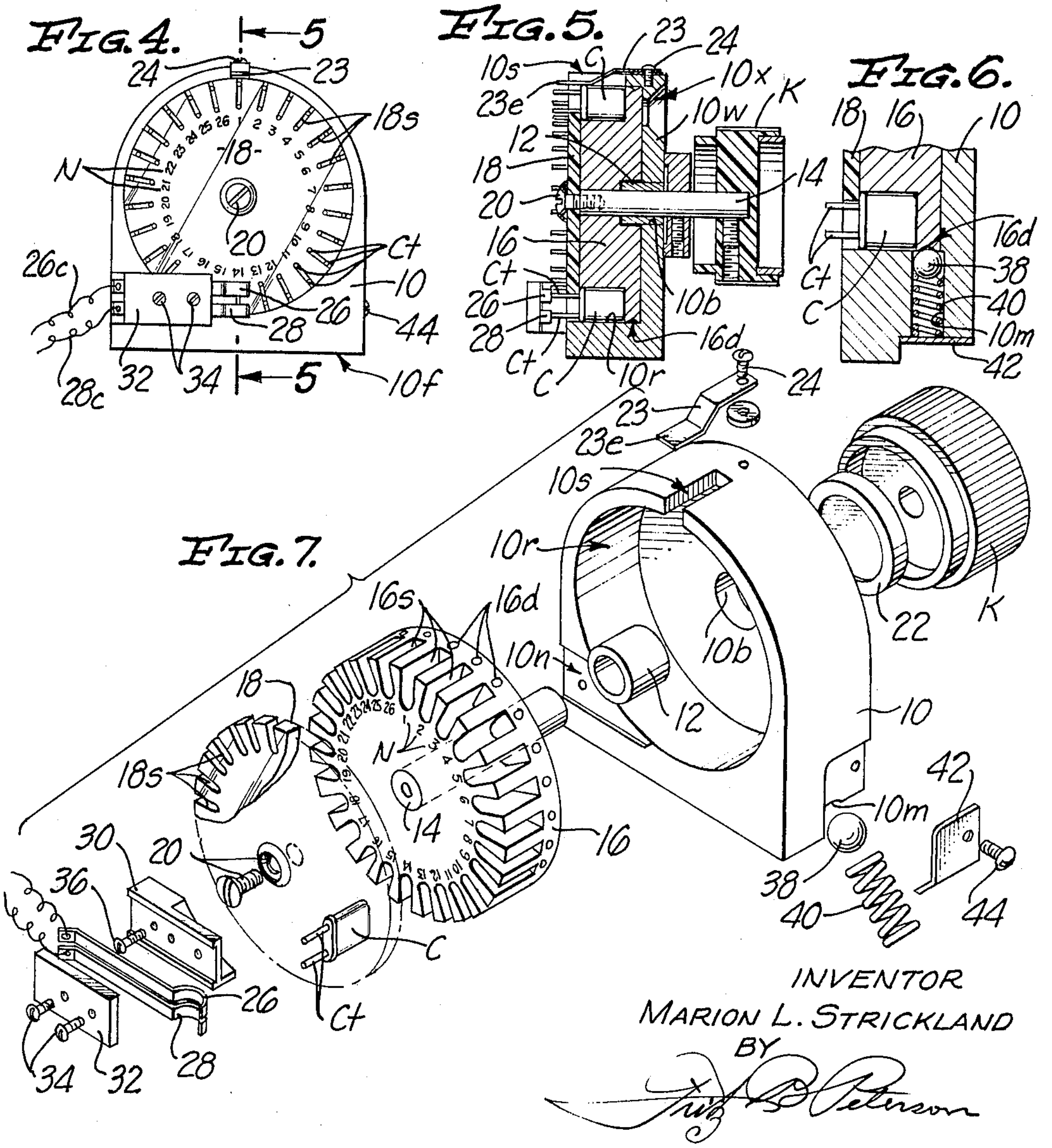
FIGURE 4 is a rear view of the selector shown in FIGURES 1–3.
FIGURE 5 is a sectional view taken as indicated at 5—5 in FIGURE 4.
FIGURE 6 is a sectional view taken as indicated at 6—6 in FIGURE 1.
FIGURE 7 is a pictorial view of parts of the selector shown in FIGURES 1–4, in disassembled array, with some portions shown in phantom form.

Disposed in the bore **10*b* of the base is a shaft-bearing in the form of a fixed bushing 12 in which is rotatably mounted a rotor shaft 14. Affixed to shaft 14 for rotation therewith and thereby is a rotor comprising a cylinder 16 and a cover 18. The cover is secured to the cylinder 16 and shaft 14, as by screw-and-washer fastener means 20; and the cylinder 16 is secured to the shaft 14 as by being provided with a slightly under-sized bore and being press-fitted on one end of the shaft. The cylinder is also provided with a counter-bore or enlarged bore at one end, for free accommodation of a rearward extension of the bushing 12, as shown in FIGURE 5. The rotor is dimensioned to fit snugly for easy rotation in the recess 10***r* of the base. On its forward or other end, the shaft 14 carries a retaining collar 22 and an actuating knob K, each of which is secured to the shaft by set-screw means. By the described means and construction the rotor is retained in the base and is supported for rotation therein by manual manipulation of the knob.

A set or series of slots or pockets, such as those indicated at 16*s* (FIGURE 7) is provided in cylinder 16, as by milling or molding, the pockets being open at the periphery and also at the rear face of the cylinder. The pockets are dimensioned to receive the body of a respective crystal device such as that indicated at C in FIGURE 7. Each crystal device has a pair of conductive terminal pins C*t* protruding from one end of the body thereof and having internal electrical connection to the crystal electrodes. The crystal devices are prevented from axial displacement from respective pockets by the noted cover 18. The cover is provided with an annular series of radial slots 18*s* (FIGURE 4, and shown only in part in FIGURE 7), through which the pairs of terminal pins of the crystal devices protrude. The slots 18*s* are too narrow for axial exit of the bodies of the crystal units or devices. Thus, since the rotor including cylinder 16 and cover 18 are disposed within the recess 10*r* of the base, any crystal device C contained in one of the pockets 16*s* is restrained from radial exit or displacement by the encircling portion of the base 10, except as presently noted.

To permit ready exchange or removal or insertion of a crystal device into the rotor without disassembly of any of the apparatus, a slot 10*s* (FIGURE 7) is formed radially in the upper wall of the base, the location preferably being such that either of the pockets in the rotor may be rotated into registry or alignment with the slot and such that when such registry obtains, the terminal pins of a remote crystal device in another pocket are electrically active as will presently be explained. To prevent undesired exit of crystal devices out of the rotor through slot 10*s* of the base, the slot is normally closed by an elongate shaped spring member 23 (FIGURES 2, 3, 5 and 7) which spring is secured at one end thereof to the top of base 10 by screw means 24. The spring member 23 has a depressed end portion 23*e* extending into the slot 10*s* of the base, as indicated in FIGURE 5. To allow intentional movement of a crystal device from or into a pocket, the protruding end 23*e* (FIGURES 3 and 5) of the spring is engaged and lifted clear of the slot and the entire spring rotated about screw means 24 to uncover the slot. Thereafter the device may be removed by engaging the ends of its terminal pins with a finger or other lifting member and lifting the device out; and a device may be inserted into an empty pocket by pressing it through the opened slot. Return of the spring 23 to normal position in close adjacency to the circular path of the outermost edges of the pocketed devices again prevents undesired displacement of any of the devices outwardly via the slot 10*s*.

Figure 2:
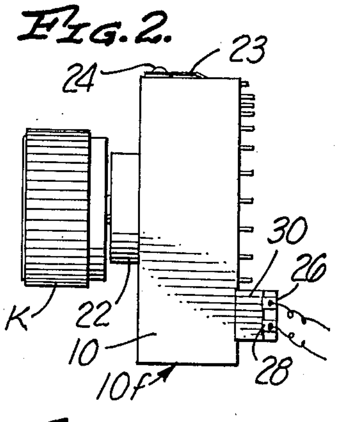
FIGURE 2 is a side view of the selector depicted in FIGURE 1.
Figure 3:
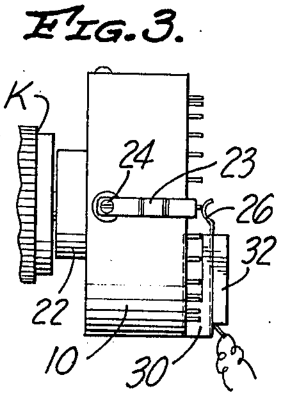
FIGURE 3 is a top view of the selector shown in FIGURE 1, with a portion broken away.

As is indicated in FIGURES 2 and 5, the terminal pins C*t* of the pocketed crystal devices C protrude from the rear end of the rotor cylinder 16 and through the radial slots 18*s* of the cover 18. Thus, as the rotor is rotated, each set or pair of protruding terminal pins is brought individually into contact with a respective one of first and second shaped conductive leaf-spring contacts 26, 28 (FIGURES 4 and 7). Those contacts are mutually insulated and are supported upon and by an insulation mount or block 30 (FIGURE 3) to which the contacts are clamped by a second insulation block 32 and screw means 34. Block 30 is secured to base 10 in a complementary slot 10*n* (FIGURE 7) formed in the base, by screw means 36, whereby the appurtenant contacts and clamping means are securely affixed to the base. The screw means 34 are preferably insulated, or made of insulation, whereby to insure electrical isolation of the contacts 26 and 28, each from the other and from other components. The spring-leaf contacts are adapted to be connected in an electrical circuit, as by schematically depicted conductor means 26*c* and 28*c* (FIGURE 4).

To insure that the rotor is yieldingly retained in any position at which the terminals of a crystal device are stationed in contact with spring-leaf contacts 26 and 28 and at which rotor position a crystal device is aligned with base slot 10*s*, and to aid in centering the rotor accurately at such position or station, a series of circular depressions 16*d* (FIGURES 7 and 6) is formed in the peripheral surface of cylinder 16*d*, for partial reception of ball detent means. The depressions are equal in number to the pockets or slots 16*s* in the cylinder. Disposed in a detent bore 10*m* (FIGURE 6) in the base 10 and extending into recess 10*r* from the exterior of the base is a detent ball 38 and a detent compression spring 40 which serves to urge the ball inwardly into engagement with the periphery of rotor cylinder 16 and into seating relationship with any of the depressions 16*d*, which latter are appropriately situated for such coaction. The spring is maintained in the bore 10*m*, under compressive stress, by a retainer in the form of a plate 42 which is removably secured to base 10 by fastener means such as a screw 44. The relative dispositions of depressions 16*d*, ball 38, crystal device pockets or slots 16*s*, and contact spring 26 and 28 are such that when any slot 16*s* of the rotor cylinder is in alignment with slot 10*s* in the upper curved wall of the base 10, the active curved surfaces of spring contacts 26 and 28 are positioned in contact with (or in position to be engaged by) respective crystal device terminal pins C*t* of a device disposed in another of the pockets or slots 16*s*, and ball 38 is accurately seated in one of depressions 16*d*. Thus at any position of the rotor in which a rotor slot 16*s* is aligned with base slot 10*s*, contact springs are accurately positioned to be in active electrical contact with terminal pins of a crystal device, and the ball detent acts to releasably retain the rotor in that position but subject to forcible release of the rotor in response to application of sufficient torque to shaft 14.

Figure 1:
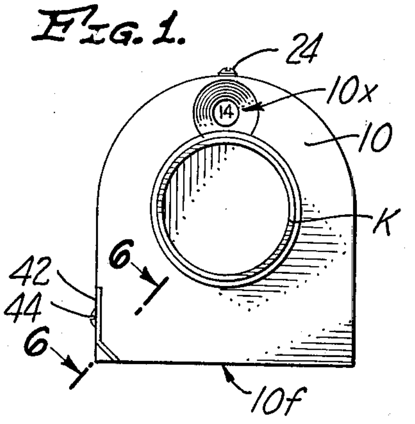
FIGURE 1 is a front view in elevation of a preferred crystal selector according to the invention.

To provide a visible indication at the front of the selector as to which crystal device (or pocket) is in active position relative to spring contacts 26 and 28, there is formed in the face of base 10 a beveled opening or window 10*x* (FIGURES 1 and 5) open to the rotor-receiving recess 10*r*; and there is produced on the adjacent inner circular face of rotor cylinder 16, in position to be brought successively one at a time into registry with the window, a series of numerical or like indicia, such as the number 14 visible through the window in FIGURE 1. The indicia are equal in number to the rotor pockets, and are spatially arranged so any particular one thereof is juxtaposed behind the window when the correspondingly identified crystal device is in active position with its terminal pins in electrical contact with spring contacts 26 and 28.

To facilitate correlated insertion or placement of crystal devices in correspondingly identified pockets or slots, whereby when a particular number or indicia appears at window 10*x* the correspondingly identified crystal device will be in the slot or pocket at the active position at the spring contacts, a second circular series of the same numbers or indicia is produced on the rear face of the rotor cylinder, as shown at N in FIGURES 4 and 7; and cover 18 is made of transparent material such as methyl methacrylate polymer or the like. The second series or set of indicia is rotationally displaced from the first, and the relative dispositions of the two sets of indicia is such that when a patricular one of the first set, such as numeral 6, for example, is brought into registry with window 10*x* at the front of the selector, the corresponding numeral (6) of the second set is next-adjacent the curved portions of the spring contacts 26 and 28. Thus, to insert a crystal device which is identified by the indicia or number 6, for example, in the proper pocket, the rotor is rotated until indicia number 6 at the rear face of the rotor is disposed below slot 10*s*; and the device identified by number 6 is inserted in the pocket by the procedure previously explained. Thereafter, to bring the device thus identified by number 6 into electrical engagement with the spring leaf contacts 26 and 28, the rotor is merely turned until the number 6 comes into registry with window 10*x* at the front face of the selector.

The materials of which the rotor cylinder and the base are formed or made may be selected in accord with accepted principles of design. In the exemplary structure they are made of aluminum alloy and are anodized, but other materials may be used. The rotor cylinder slots are formed, as by milling, of dimensions such as to receive with a close fit the crystal device bodies whereby the crystal devices are not squeezed or stressed but are closely confined so no appreciable unintentional movement of the devices can occur. Thus the devices are not subjected to undesirable stress but are accurately positioned, each in a respective and correspondingly identified slot, and are fully protected.

As is evident from consideration of the preceding description, the selector is of simple and compact construction, is such that insertion and removal of crystal devices are easily and accurately accomplished without disassembly of parts, is such that undesired displacement of crystal devices is prevented, and is such that the electrical circuit electrically viewed or faced by any of the crystal devices when brought into active position is the same irrespective of which device is selected. Further, it is similarly evident that the selector, while of inexpensive construction, is capable of containing a large number of crystal devices, and is such that the devices are protected against physical damage by being enclosed in and by the rotor and base, while being easily accessible for exchange. Thus the objects of the invention, as herein made evident in the description and the appended claims, are fully attained.

I claim:

1. Selector apparatus for holding a plurality of piezo crystal devices each having pin terminals, said apparatus operable to bring any of the held crystal devices into an active position at a station in which it is thereby electrically connected to circuit means, said apparatus comprising:

first means, including a base means having a cylindrical recess therein formed about an axis and a slot therethrough from said recess to the exterior of the base, second means, including rotor means disposed in close-fitting relation to and for rotation in said cylindrical recess, said rotor means defining along an arcuate periphery thereof a plurality of pockets each rotatable into registry with said slot for entry of a crystal device into the pocket through said slot, said rotor means including means for supporting piezo crystal devices in said pockets with the pin terminals thereof protruding therefrom and oriented for rotation to said active position at said station;

third means, including spring contact means disposed at said station in position to be contacted by the pin terminals of any crystal device rotated to said station by said rotor means, whereby to electrically connect that crystal device to such circuit means;

said first means including movable closure means normally in a first position and therein barring exit of a crystal device from said rotor means through said slot and movable to a second position permitting such exit, whereby to permit insertion and removal of crystal devices through said slot; and fourth means, including means for imparting rotation to said rotor means for rotating one of said pockets into registry with said slot and for rotating the pin terminals of a crystal device in one of said pockets into engagement with said spring contact means at said station.

2. Selector apparatus according to claim 1, said first means and said second means comprising unique pocket-identifying indicia and means presenting a visible indication of the idicia identifyng that one of said pockets which is at any time disposed at said station for engagement by said contact means of the pin terminals of any piezo crystal device contained in said one of said pockets.

3. Selector apparatus according to claim 1, said first and second means comprising mutually cooperative means including yielding means, effective to yieldingly restrain said rotor means from rotation from any position in which one of said pockets is at said station.

4. Selector apparatus according to claim 1, in which said first and second means are so arranged that when a selected crystal device in a first one of said pockets is positioned in said active position at said station with its terminal pins in contact with said spring contact means a second one of said pockets is in registry with said slot, whereby a crystal device may be removed from or inserted into said second pocket through said slot without movement of said selected crystal device from said active position.

5. Selector apparatus as defined by claim 1, said first and second means comprising cooperating means including on said rotor means a first series of pocket-identifying indicia, one indicia for each of said pockets and each unique, said cooperating means effective to present at any time a visible indication identifying the particular one of said pockets positioned at said station, and said rotor means presenting a second series of indicia, correlated with but rotationally displaced from said first series of indicia and so disposed that the indicia identifying a particular one of said pockets is next-adjacent to that pocket and in registry with said slot when that pocket is in registry with said slot, to facilitate accurate placement of any indicia-identified crystal device in that slot similarly identified by the same indicia.

References Cited

UNITED STATES PATENTS

| | | | |
|---|---|---|---|
| 1,639,817 | 8/1927 | Taylor | 310—9.1 |
| 2,451,966 | 10/1948 | Massa | 310—9.1 |
| 2,995,736 | 8/1961 | Tellerman | 310—8.1 |
| 2,694,779 | 11/1954 | Minnich | 331—161 |
| 3,201,714 | 8/1965 | Border | 331—161 |
| 3,233,191 | 2/1966 | Brian | 331—161 |
| 3,300,665 | 1/1967 | Hilton | 310—9.1 |

J. D. MILLER, Primary Examiner

U.S. Cl. X.R.

310—8.1; 331—161